US005945596A

United States Patent [19]

Burkel et al.

[11] Patent Number: 5,945,596

[45] Date of Patent: Aug. 31, 1999

[54] METHOD AND DEVICE FOR MONITORING A FUEL-METERING SYSTEM

[75] Inventors: Rainer Burkel, Asperg; Bernhard Bronkal, Köngen; Jürgen Biester, Böblingen; Martin Grosser, Korntal-Münchingen; Rainer Öttinger, Wiernsheim; Wilhelm Eyberg, Leonberg; Lutz-Martin Fink, Asperg, all of Germany

[73] Assignee: Robert Bosch GmbH, Stuttgart, Germany

[21] Appl. No.: 08/817,558

[22] PCT Filed: Apr. 27, 1996

[86] PCT No.: PCT/DE96/00737

§ 371 Date: Apr. 21, 1997

§ 102(e) Date: Apr. 21, 1997

[87] PCT Pub. No.: WO97/12136

PCT Pub. Date: Apr. 3, 1996

[30] Foreign Application Priority Data

| | | | |
|---|---|---|---|
| Sep. 28, 1995 | [DE] | Germany | 195 36 111 |
| Dec. 22, 1995 | [DE] | Germany | 195 48 279 |

[51] Int. Cl.[6] ..... G01M 15/00

[52] U.S. Cl. ..... 73/118.1

[58] Field of Search ..... 73/49.7, 113, 117.2, 73/117.3, 118.1, 119 A

[56] References Cited

U.S. PATENT DOCUMENTS

| | | | |
|---|---|---|---|
| 5,533,477 | 7/1996 | Weigl | 73/119 A |
| 5,731,515 | 3/1998 | Tominaga et al. | 73/119 A |
| 5,770,796 | 6/1998 | Sakamoto et al. | 73/119 A |

FOREIGN PATENT DOCUMENTS

| | | |
|---|---|---|
| 57-020553 | 3/1982 | Japan . |
| 60-026164 | 9/1985 | Japan . |

*Primary Examiner*—Richard Chilcot
*Assistant Examiner*—Eric S. McCall
*Attorney, Agent, or Firm*—Kenyon & Kenyon

[57] ABSTRACT

A method and a device for monitoring a fuel-metering system, in particular a common-rail system for a diesel fuel engine. A defect is recognized on the basis of an output signal from a structure-borne noise sensor.

9 Claims, 5 Drawing Sheets

METHOD AND DEVICE FOR MONITORING A FUEL-METERING SYSTEM

FIELD OF THE INVENTION

The present invention, a continuation of PCT/DE96/00737 dated Apr. 27, 1996, relates to a method and a device for monitoring a fuel-metering system.

BACKGROUND INFORMATION

A method and device of this type are disclosed by U.S. Pat. No. 5,241,933. It describes a method and a device for monitoring a high-pressure circuit when working with a common-rail system. In the case of the device it describes, the pressure prevailing in the rail is regulated. If the manipulated variable of the pressure control loop lies outside of a specifiable range, the device recognizes the existence of an error.

In addition, devices are known, where the existence of an error is inferred on the basis of the pressure prevailing in the rail. The pressure is thereby compared to lower and upper limiting values, and the existence of errors is recognized when the pressure lies outside of the specified range of values.

The drawback of these arrangements is that an error is first recognized in response to a substantial pressure drop.

SUMMARY OF THE INVENTION

Given a device and a method for monitoring a fuel-metering system, the object of the present invention is to be able recognize the existence of errors in the most reliable and simple manner possible.

The method and device according to the present invention make it possible for errors in the metering system to be recognized reliably and simply. In particular, it is possible to reliably verify defective injectors in common-rail systems.

DETAILED DESCRIPTION OF THE INVENTION

Figure 1:
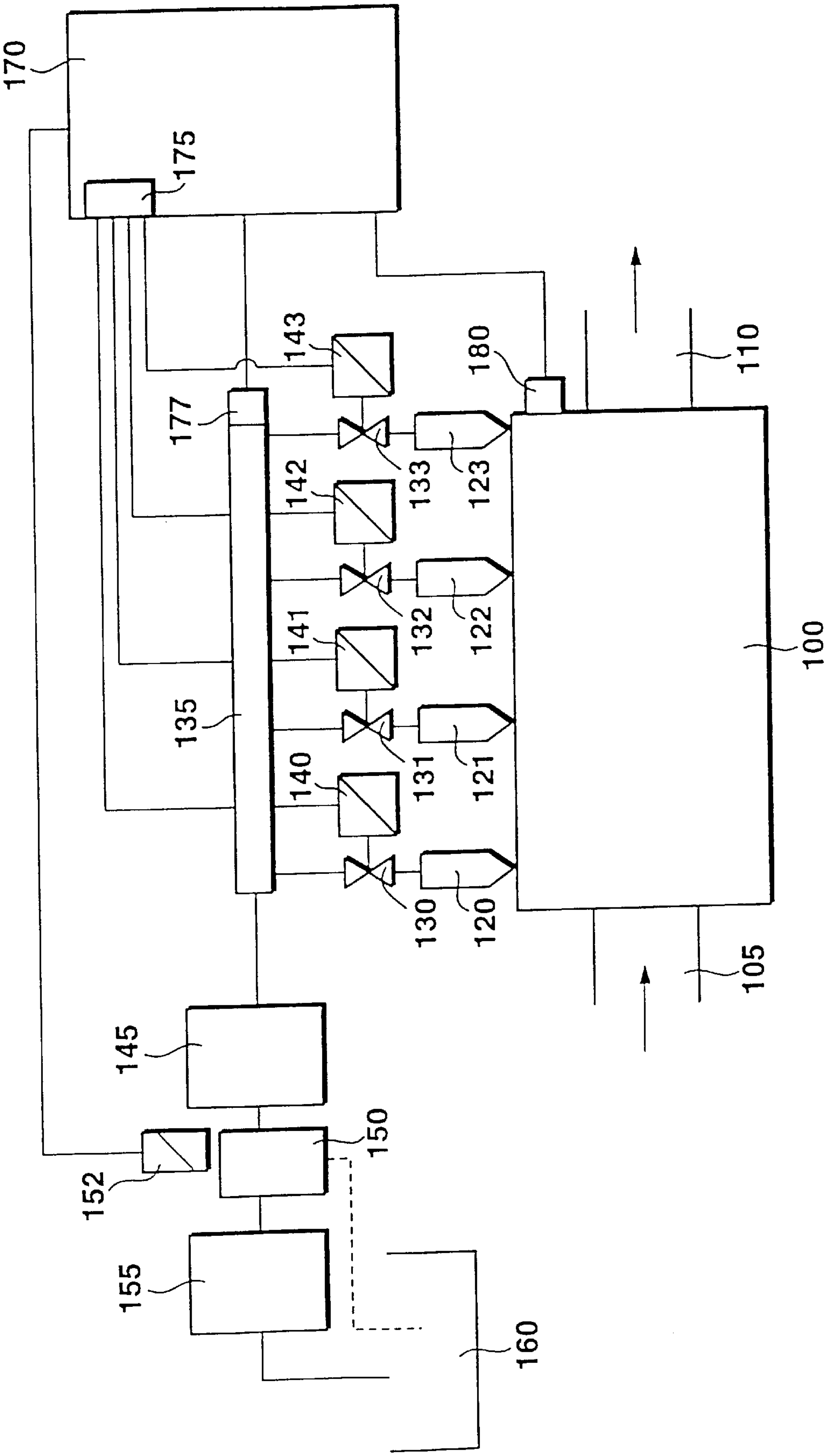
FIG. 1 illustrates a block diagram of the device according to one embodiment of the present invention.

The device according to the present invention will now be elucidated based on the example of a self-ignition internal combustion engine, in which the fuel metering is controlled by means of a solenoid valve. The specific embodiment of the present invention shown in FIG. 1 relates to what is known as a common-rail system. However, the procedure in accordance with the present invention is not limited to these systems. It can be employed in all systems where such a fuel metering is possible.

Element 100 denotes an internal combustion engine, which is supplied with fresh air via an intake line 105 and which emits exhaust gas via an exhaust pipe 110.

The illustrated internal combustion engine is a four-cylinder internal combustion engine. Assigned to each cylinder of the internal combustion engine are injectors 120, 121, 122 and 123. Fuel is metered to the injectors via solenoid valves 130, 131, 132 and 133. The fuel arrives from what is known as a rail 135, via injectors 120, 121, 122 and 123 in the cylinders of the internal combustion engine 100.

The fuel in rail 135 is pressurized to an adjustable pressure by a high-pressure pump 145. The high-pressure pump 145 is connected via a solenoid valve 150 to a fuel-supply pump 155. The fuel-supply pump communicates with a fuel supply tank 160.

An electric fuel pump or a mechanical fuel pump can be used as a fuel-supply pump. The use of an electric fuel pump requires a preliminary filter. Due to the high fuel temperatures, the electric fuel pump is preferably arranged in the vicinity of the tank. This results in large volumes between the electric fuel pump and the high-pressure pump, and substantial and, thus, long switch-off times. A rapid reduction in pressure, especially in the event of an error, can only be effected with additional outlay.

These disadvantages are not associated with a mechanical auxiliary supply pump arranged near the internal combustion engine. In the case of the mechanical auxiliary supply pump, solenoid valve 150 (also referred to as a shutoff value) is additionally necessary, which in case of an error prevents the fuel from being supplied to the high-pressure pump 145. Shutoff valve 150 can be optionally designed as a separate structural unit. However, it can also be integrated, on the intake side, in high-pressure pump 145 or, on the delivery side, in auxiliary supply pump 155.

Valve 150 includes a coil 152. Solenoid valves 130, 131, 132 and 133 contain coils 140, 141, 142 and 143, which can each receive current by means of an output stage 175. Output stage 175 is preferably arranged in a control unit 170, which drives coil 152 accordingly.

Furthermore, a sensor 177 is provided, which detects the pressure prevailing in rail 135 and routes a corresponding signal to control unit 170. Element 180 is a structure-borne noise sensor, which is mounted on the engine at a spot that conducts well acoustically. This structure-borne noise sensor applies a corresponding signal to the control unit. In place of the structure-borne noise sensor, it is likewise possible to use an acceleration sensor or a knock sensor.

One embodiment of the device according to the present invention functions as follows. The fuel-supply pump 155 delivers fuel from the supply tank, via valve 150, to high-pressure pump 145. High-pressure pump 145 builds up a specifiable pressure in rail 135. Usually, pressure values of greater than 800 bar are reached in rail 135.

The appropriate solenoid valves 130 through 133 are driven by conducting current through coils 140 through 143. The drive signals for the coils thereby establish the beginning of injection and the end of injection of the fuel through injectors 120 through 123. The drive signals are established by the control unit in dependence upon various operating conditions, such as the driver's desire, speed, and other variables.

When working with a common-rail system, such a sustained injection of an injector can not be easily recognized with certainty, given a balancing of masses in the rail. This can lead to an unwanted increase in torque at one cylinder and even cause destruction of the engine when the peak cylinder pressures or the permissible temperatures are exceeded.

With the aid of the structure-borne noise sensor or by means of an acceleration sensor, in accordance with the present invention, the vibrations emanating from the combustion chamber are detected and reprocessed by means of an evaluation circuit.

If the vibration of one individual cylinder deviates significantly from the remaining cylinders or from the expected value, then the inference is made that an error exists in the corresponding injector.

Figure 2A:
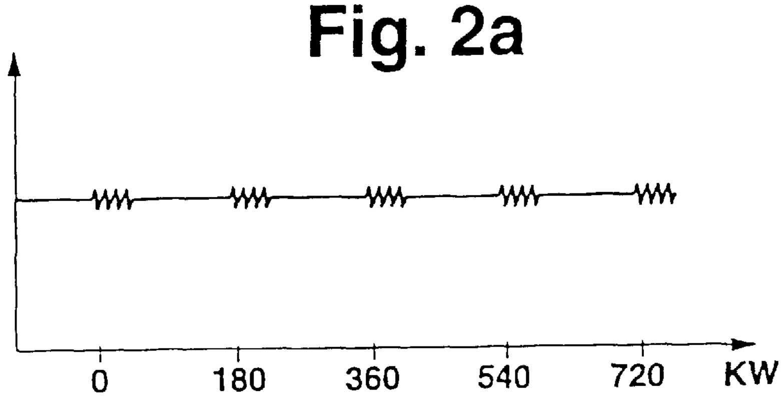
FIG. 2*a* illustrates signals from a structure-borne noise sensor plotted over time according to one embodiment of the present invention.
Figure 2B:
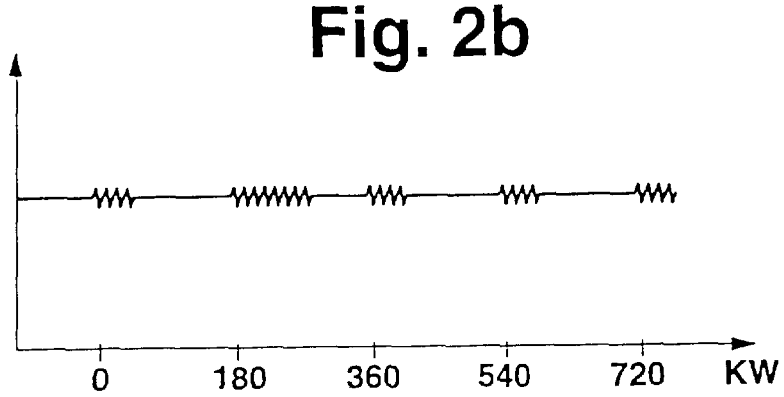
FIG. 2*b* illustrates signals from a structure-borne noise sensor plotted over time, given a faulty injector in the second cylinder, according to one embodiment of the present invention.
Figure 2C:
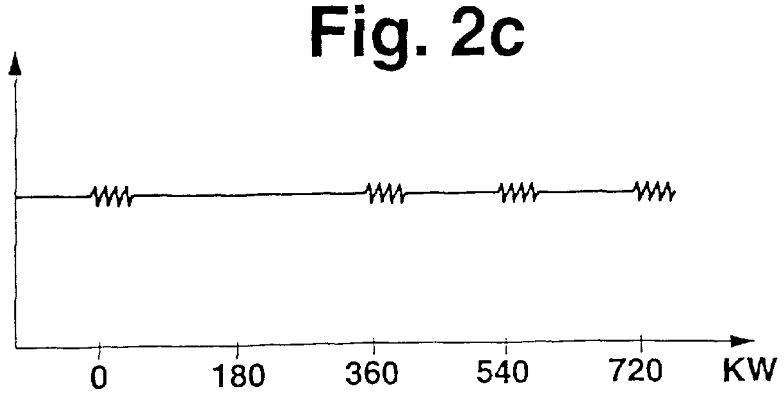
FIG. 2*c* illustrates signals from a structure-borne noise sensor plotted over time when no fuel is injected into the second cylinder, according to one embodiment of the present invention.

The output signal from the structure-borne noise sensor is plotted in FIGS. 2*a*–2*c* over the arc of crankshaft rotation. The output signal from the structure-borne noise sensor when all injectors are experiencing a faulty operation is plotted in FIG. 2*a* over the arc of crankshaft rotation. The metering into the first cylinder takes place within the range of the top dead center, i.e., at 0° arc of crankshaft rotation of the first cylinder. This leads during metering or during combustion to a significant signal from the structure-borne noise sensor. A corresponding signal occurs in response to combustion in the second cylinder at 180° arc of crankshaft rotation, in response to combustion in the third cylinder at 360° arc of crankshaft rotation, and in response to combustion in the fourth cylinder at 540° arc of crankshaft rotation.

FIG. 2*b* illustrates the corresponding signal given a faulty injector of the second cylinder. The sound emission during the combustion in the second cylinder is noticeably prolonged. This indicates that the injector of the second cylinder is not working properly. This injector is in its open state for longer than intended.

In FIG. 2*c*, no fuel is injected into the second cylinder, which means the injector allocated to the second cylinder does not enable any fuel metering.

Figure 3:
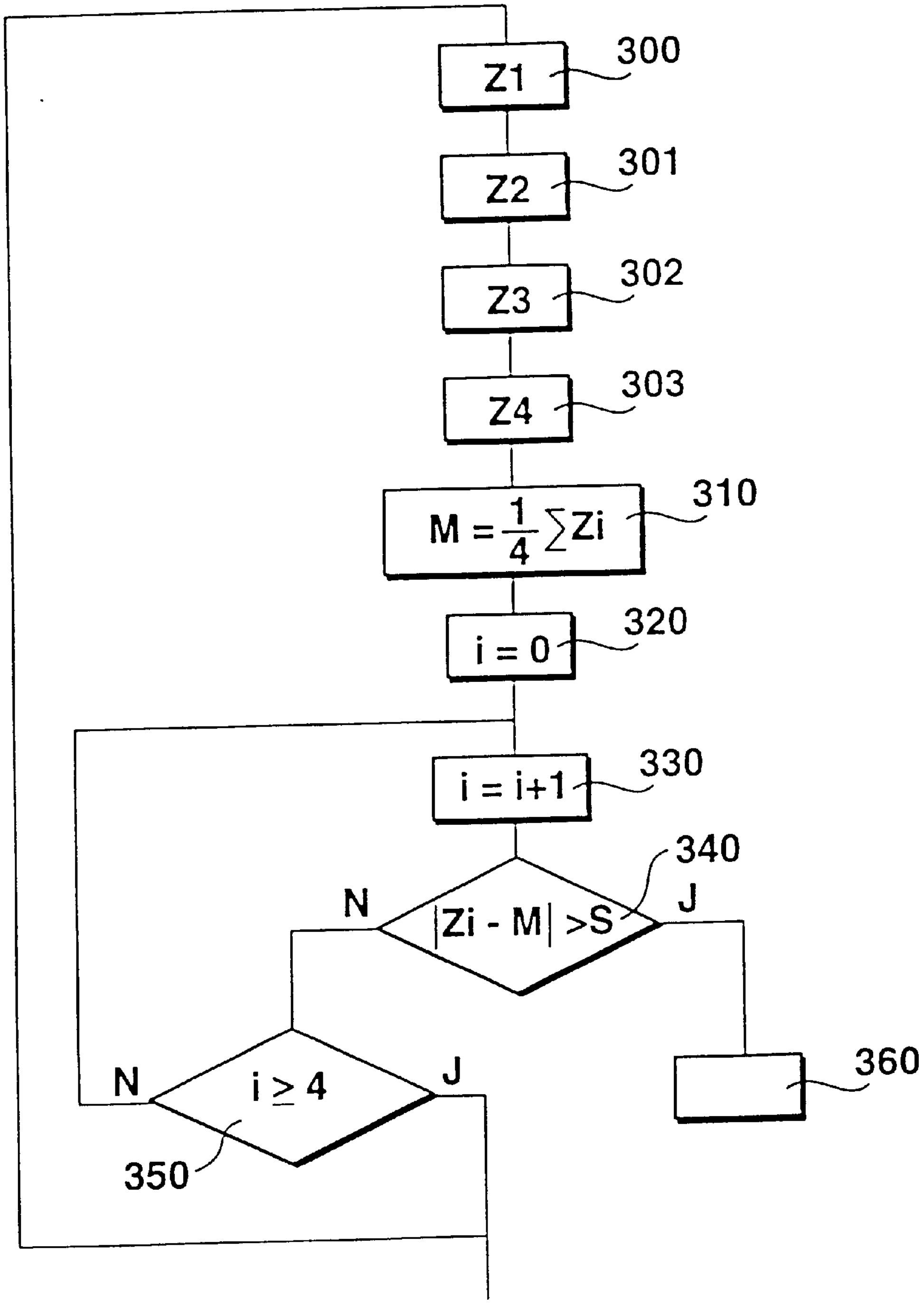
FIG. 3 illustrates a flow chart of the method according to one embodiment of the present invention.

The evaluation process for recognizing the error is illustrated by way of example in FIG. 3. In step 301, the output signal from the structure-borne noise sensor is detected when fuel is metered into the first cylinder Z1. Correspondingly, in step 300, the structure-borne noise sensor signal is detected during combustion in the second cylinder Z2. In steps 302 and 303, the structure-borne noise sensor signal is detected for cylinders Z3 and Z4. In step 310, the amplitudes of the four signals are summed and divided by four. This yields the average value M of the four structure-borne noise sensor signals.

In step 320, a counter I is set to 0 and increased by 1 in subsequent step 330. Query 340 checks whether the difference between the amplitude Zi of the I-th cylinder and the average value M is greater than a threshold value S. If this is not the case, query 350 checks whether I is greater than or equal to four. If this is not the case, then step 330 follows again, or when I is greater than four, step 300 follows.

If query 340 recognizes that the amount of the difference between the amplitude of the I-th cylinder Zi and the average value M is greater than the threshold value S, then the existence of errors is recognized in step 360 and appropriate measures are introduced.

The method delineated here was described based on the example of a four-cylinder internal combustion engine. By properly choosing the parameters, in particular that of I, the method according to one embodiment of the present invention can also include internal combustion engines having different numbers of cylinders.

Optionally, not the amplitude of the signal, but rather the time duration of the signal can also be evaluated for recognizing errors.

Figure 4:
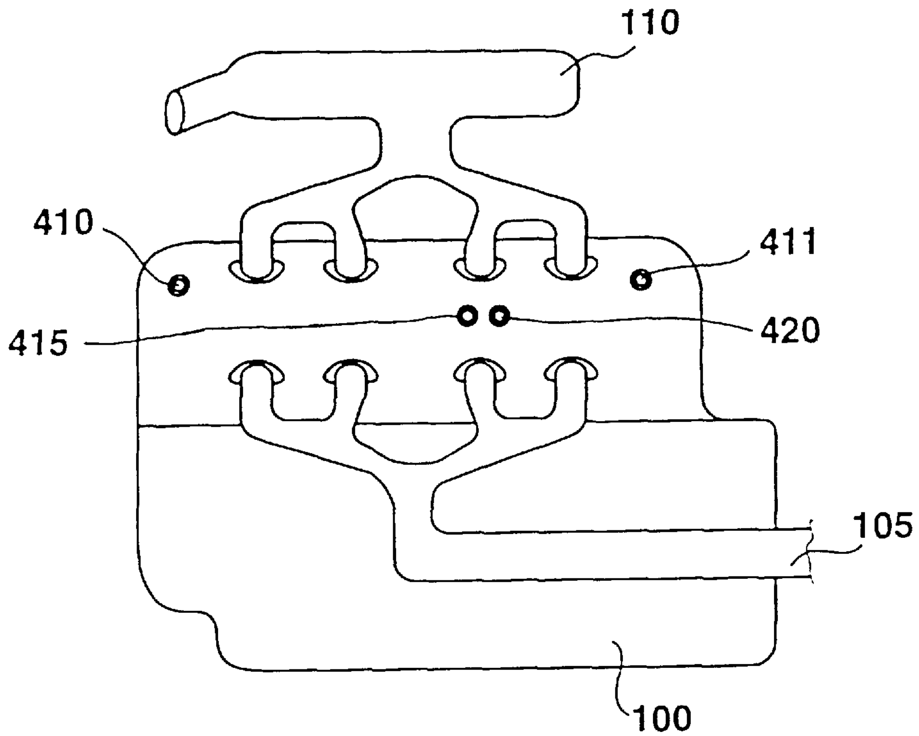
FIG. 4 illustrates a schematic representation of an internal combustion engine incorporating one embodiment of the present invention.

Another advantageous embodiment of the present invention is illustrated in FIGS. 4–6*e*. Schematically illustrated in FIG. 4 is a four-cylinder diesel fuel engine having two structure-borne noise sensors 410 and 411, which are mounted so as to be acoustically conductive on the engine. Element 415 denotes a needle-motion sensor and 420 a cylinder-pressure sensor. Element 105 denotes the fresh-air pipes, and 110 the exhaust pipes.

Figure 5:
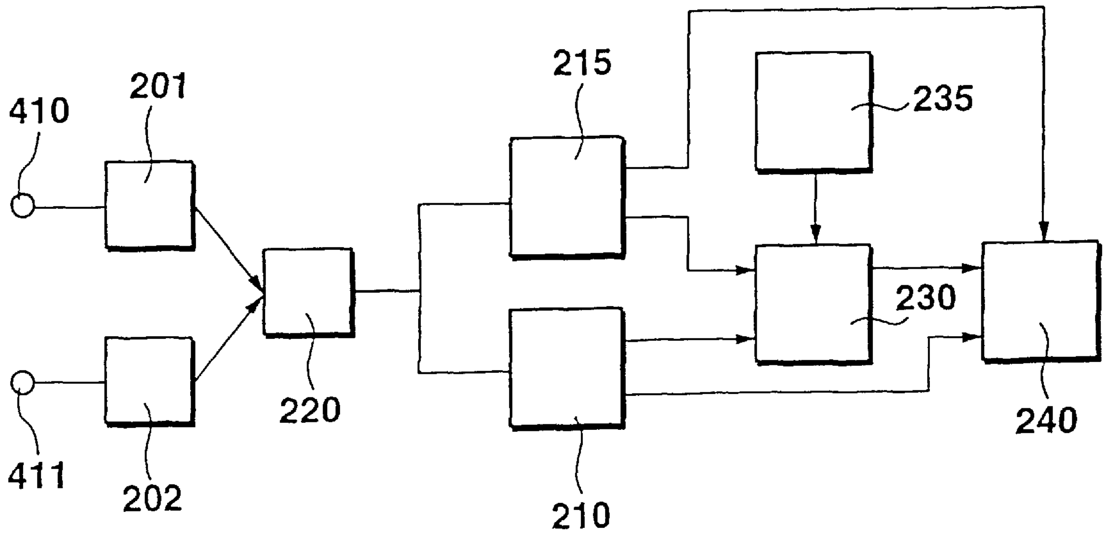
FIG. 5 illustrates a block diagram of the signal evaluation method according to one embodiment of the present invention.
Figure 6:
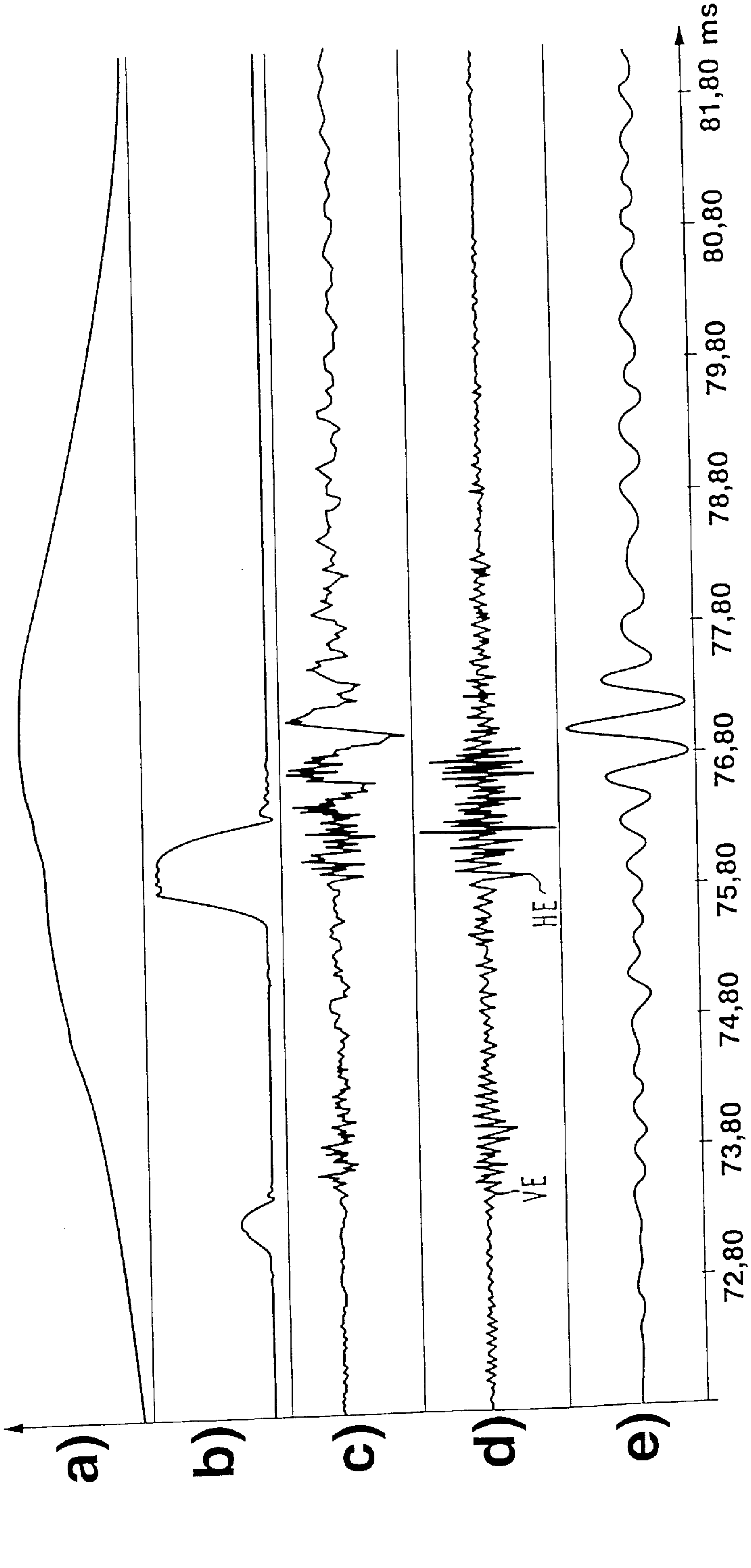
FIG. 6*a* illustrates the cylinder pressure plotted over time according to one embodiment of the present invention.
FIG. 6*b* illustrates the output from a needle motion sensor plotted over time according to one embodiment of the present invention.
FIG. 6*c* illustrates the output from a knock sensor plotted over time according to one embodiment of the present invention.
FIG. 6*d* illustrates the output signal from a band pass filter plotted over time according to one embodiment of the present invention.
FIG. 6*e* illustrates the output signal from a band pass filter plotted over time according to one embodiment of the present invention.

In FIG. 5, the signal evaluation for the two knock sensors 410 and 411 is illustrated as a block diagram. The output signal from the first knock sensor 410 arrives via a propagation-delay correction 201 at a cylinder selection 220. Accordingly, the output signal from the second knock sensor 411 arrives via a second propagation-delay correction 202 at cylinder selection 220.

From cylinder selection 220, the signal arrives at a first band pass 210 and at a second band pass 215. The output signals from the band passes arrive at a signal processing 230, which in turn applies signals to a valve-timing unit 240. Furthermore, output signals from band passes 210 and 215 arrive directly at engine timing 240. Furthermore, signal processing 230 processes signals from various sensors 235.

This device functions as follows: the propagation delay of the diverse signals from a signal source to the different knock sensors 410 and 411 varies. This propagation delay is compensated by the propagation delay corrections 201 and 202. On the basis of the signal height, which in turn is a function of the distance between the signal source and the sensor, the cylinder recognition assigns the signal to a specific sensor. This enables an allocation to be performed between the detected signal and the corresponding cylinder.

In principle, the procedure described in the following can also be carried out with a structure-borne noise sensor. The signal quality can be substantially improved when of two or more structure-borne noise sensors are used. It is especially beneficial for the structure-borne noise sensors to be arranged at spatially different installation sites on the engine. By summing the signals that have been corrected for propagation delay, the useful signal can be substantially increased in comparison to spurious signals.

The present invention provides for the first band pass to have break frequencies of 10 kHz and 30 kHz. The second band pass 215 has break frequencies of 500 Hz and 4 kHz. These frequency values merely represent recommended values, and they can vary depending on the type of internal combustion engine.

The band passes filter the output signals from knock sensors 410 or 411. On the basis of the filtered signals, the signal processing defines different variables which characterize the injection or combustion. The thus obtained signals are used by the engine timing for the open and closed-loop control of the internal combustion engine.

Plotted over time in FIG. 6*a* is the cylinder pressure, in FIG. 6*b* the output signal from the needle-motion sensor; in FIG. 6*c* the output signal from one of the knock sensors; in FIG. 6*d* the output signal from the first band pass; and in FIG. 6*e* the output signal from the second band pass. In response to the small quantities for the preliminary injection, the valve needle generally does not open up to the top limit stop.

In the case of the preliminary injection, one can merely perceive the needle hitting against the lower limit stop at the end of the injection process. At this instant, the amplitude of the output signal from the knock sensor rises. Also at this instant, the high-frequency components of the output signal from the knock sensor increase. This instant is designated VE.

At the beginning and end of the main injection, the needle of the needle-motion sensor moves to the lower or to the upper limit stop. At these instants, the amplitude of the output signal from the knock sensor and, in this case, in particular the high-frequency components rise. This instant is designated as HE.

The beginning and end of the main injection are recognized when the needle of injectors 120 through 123 moves during opening operation up to the upper limit stop and during closing operation to the lower limit stop. These instants are recognized on the basis of the output signal's rise from the first band pass over a first threshold value. If the injector needle's hitting is not recognized, or if it is not recognized when the injector is closing, then this is evidence of a sustained injection.

Based on these signals, the decision is made during every injection whether a sustained injection is taking place or not. The monitoring preferably follows individually for each cylinder. When a specifiable number of sustained injections is recognized for one cylinder, this is evidence of a defect.

If the fuel-supply pump is designed as a mechanical auxiliary supply pump, for example as a gear pump, then there is no actual way to interrupt the delivery of fuel by means of the auxiliary supply pump, since it is driven directly by the engine. Therefore, the present invention provides for the fuel delivery from auxiliary supply pump 155 to high-pressure pump 145 to be interrupted by means of the electrical shutoff valve 150 between auxiliary supply pump 155 and high-pressure pump 145.

When an error is recognized, valve 150 interrupts the supply of fuel to high-pressure pump 145. An error can be recognized in this case, for example, using the described procedure. However, other methods for recognizing errors are feasible.

If valve 150 is designed as a 2/2 valve, i.e., it blocks the flow between auxiliary supply pump 155 and high-pressure pump 145, then a pressure builds up upstream from the valve when the valve is closed. Appropriate measures are provided to avoid this pressure build-up. For example, a relief valve can be integrated in the auxiliary supply pump. Alternatively, the shutoff valve can be designed as a 3/2 valve. In such a case, when valve 150 is driven, the fuel arrives via a line, drawn in with a dotted line, from auxiliary supply pump 155 directly back in fuel supply tank 160. The need has been eliminated in this alternative embodiment of the present invention for a relief valve in auxiliary supply pump 155.

What is claims is:

1. A method for monitoring a metering system in an engine which includes a plurality of cylinders, wherein a fuel flow is delivered by at least a first pump from a low pressure area to a high pressure area, the method comprising the steps of:

generating an output signal from a structure borne noise sensor for each of the plurality of cylinders;

computing an average value of the output signals from the plurality of cylinders; and recognizing a malfunction in the metering system when the output signal of a particular cylinder deviates from the average value B.C. Mode than a specified value.

2. A method for monitoring a metering system in an engine which includes a plurality of cylinders, wherein a fuel flow is delivered by at least a first pump from a low pressure area to a high pressure area the method comprising the steps of:

generating an output signal from a structure borne noise sensor for each of the plurality of cylinders, the output signal having a time duration;

computing an average time duration of the output signals from the plurality of cylinders; and recognizing a malfunction in the metering system when the time duration of the output signal for a particular cylinder deviates from the average time duration by more than a specified value.

3. The method of claim 1, wherein each of the plurality of cylinders has an injection period, and further comprising the steps of:

filtering the output signal to generate a filtered signal; and determining one of a beginning of the injection period and an end of the injection period as a function of the filtered signal;

generating a signal indicative of one of the beginning and end of the injection period; and wherein the malfunction is recognized for one of the plurality of cylinders as a function of the signals indicative of one of the beginning and end of the injection period.

4. The method of claim 3 wherein the malfunction is recognized when a delay between the signal indicative of the beginning of the injection period and the signal indicative of the end of the injection period attains a specified delay value.

5. The method of claim 1, wherein the recognized malfunction includes a defect in a solenoid valve.

6. The method of claim 1, wherein the recognized malfunction includes a defect in a fuel injector.

7. A method for monitoring a common rail fuel metering system in a diesel fuel engine, wherein a fuel flow is delivered by at least one auxiliary fuel pump from a low pressure area to a high pressure area, comprising the steps of:

recognizing a malfunction in an operation of the fuel metering system; and stopping the fuel flow between the auxiliary pump and a high pressure pump when the malfunction is recognized.

8. A monitoring device for an engine, comprising:

a fuel metering system including at least one pump, the at least one pump including at least one auxiliary supply pump and a high pressure pump, the at least one auxiliary pump delivering a fuel flow from a low pressure area to a high pressure area;

a sensor attached to the engine, the sensor including one of a structure borne noise sensor and an acceleration sensor, the sensor generating an output signal;

an evaluation circuit coupled to the sensor, the evaluation circuit recognizing a malfunction in the metering system when the output signal deviates from a specified value; and means coupled to the fuel metering system to prevent the fuel flow from the auxiliary pump to the high pressure pump.

9. The device of claim 8, wherein the engine includes a diesel fuel engine and the fuel metering system includes a common rail fuel metering system.

* * * * *